(12) United States Patent
Farrell

(10) Patent No.: US 7,144,150 B2
(45) Date of Patent: *Dec. 5, 2006

(54) RINSEABLE SPLASH SHIELD AND METHOD OF USE

(75) Inventor: James J. Farrell, Orinda, CA (US)

(73) Assignee: f'Real Foods L.L.C., Orinda, CA (US)

( * ) Notice: Subject to any disclaimer, the term of this patent is extended or adjusted under 35 U.S.C. 154(b) by 150 days.

This patent is subject to a terminal disclaimer.

(21) Appl. No.: 10/715,171

(22) Filed: Nov. 17, 2003

(65) Prior Publication Data

US 2005/0174884 A1    Aug. 11, 2005

Related U.S. Application Data

(60) Provisional application No. 60/426,622, filed on Nov. 15, 2002.

(51) Int. Cl.
*B01F 15/00* (2006.01)
*B08B 3/02* (2006.01)

(52) U.S. Cl. ............... 366/197; 366/347; 366/348; 366/349; 134/115 R

(58) Field of Classification Search ............ 366/207, 366/347, 348, 349, 197; 134/26, 29, 34, 134/36, 42, 104.1, 166 R, 169 R, 115 R
See application file for complete search history.

(56) References Cited

U.S. PATENT DOCUMENTS

| 496,674 A | 5/1893 | Urbach | |
|---|---|---|---|
| 934,537 A | 9/1909 | Johnson | |
| 1,090,148 A * | 3/1914 | Harr | 366/207 |
| 1,313,830 A | 8/1919 | Minsk | |
| 1,496,611 A * | 6/1924 | Siegel | 366/207 |
| 1,560,826 A | 11/1925 | Kirschbraun | 366/168.1 |
| 1,847,226 A | 3/1932 | Ringwald | 366/207 |
| 1,911,202 A | 5/1933 | Nielsen | 366/207 |
| 1,913,210 A | 6/1933 | Parker | 366/207 |
| 2,003,259 A | 5/1935 | Gilbert et al. | 366/207 |

(Continued)

FOREIGN PATENT DOCUMENTS

DE       2158002       5/1973

(Continued)

OTHER PUBLICATIONS

Product literature for Hamilton Beach Models 936 P and 908. Apr. 1992.

(Continued)

*Primary Examiner*—Tony G. Soohoo
(74) *Attorney, Agent, or Firm*—Stallman & Pollock LLP

(57) ABSTRACT

The present application describes a method for rinsing a splash shield. According to the disclosed method, a vessel containing contents to be mixed is positioned in a mixing machine, and a splash shield is positioned over the opening of the vessel. After the material within the vessel is mixed by a mixing element, the splash shield is separated from the vessel and rinsed by a nozzle on the mixing machine.

In another embodiment, a vessel containing contents to be mixed is positioned in a holder on a mixing machine, and a splash shield (which may or may not be rinseable) is positioned over the opening of the vessel. The contents of the vessel are mixed using a mixing element. During and/or after mixing, opposed relative movement of the mixing element and vessel may occur, creating an upward lifting force on the vessel. The weight of the shield is sufficient to overcome this upward lifting force on the vessel and thereby causes the vessel to remain seated in the holder.

26 Claims, 3 Drawing Sheets

U.S. PATENT DOCUMENTS

| | | | |
|---|---|---|---|
| 2,012,486 A | 8/1935 | Strauss | 366/199 |
| 2,026,240 A | 12/1935 | Luxmore | 366/207 |
| 2,031,770 A | 2/1936 | Gilbert et al | 366/199 |
| 2,072,691 A | 3/1937 | Stark | |
| 2,115,809 A | 5/1938 | Goldman | 366/289 |
| 2,134,759 A * | 11/1938 | Howlett | 220/231 |
| 2,667,423 A | 1/1954 | Simpson | 99/171 |
| 2,668,765 A | 2/1954 | Stimpson | 99/55 |
| 2,701,131 A | 2/1955 | Love | 366/289 |
| 2,863,776 A | 12/1958 | Lisher | 99/136 |
| 2,898,094 A | 8/1959 | O'Neill, Jr. | 366/242 |
| 2,941,885 A | 6/1960 | Tomlinson | 99/54 |
| 2,967,433 A | 1/1961 | Phillips | 74/16 |
| 3,154,123 A | 10/1964 | Tomlinson | 146/68 |
| 3,171,635 A | 3/1965 | Haentjens et al. | 259/4 |
| 3,295,997 A | 1/1967 | Tomlinson et al. | 99/275 |
| 3,365,304 A | 1/1968 | Guterman et al. | 426/565 |
| 3,503,757 A | 3/1970 | Rubenstein | 99/136 |
| 3,514,080 A | 5/1970 | Price et al. | 366/206 |
| 3,647,472 A | 3/1972 | Speech et al. | 99/34 |
| 3,665,722 A | 5/1972 | Cornelius | 62/68 |
| 3,738,619 A | 6/1973 | Shirae | 366/98 |
| 3,865,353 A | 2/1975 | Fischer | 366/98 |
| 3,889,002 A | 6/1975 | Clausi et al. | 426/576 |
| 3,922,361 A | 11/1975 | Vann | 426/599 |
| 3,939,001 A | 2/1976 | Clausi et al. | 106/136 |
| 3,949,098 A | 4/1976 | Bangert | 426/324 |
| 4,096,893 A | 6/1978 | Harvey, Jr. et al. | 141/90 |
| 4,169,681 A | 10/1979 | Kato | 366/244 |
| 4,358,298 A | 11/1982 | Ratcliff | 55/185 |
| 4,434,186 A | 2/1984 | Desia et al. | 426/565 |
| 4,544,277 A | 10/1985 | Schnellmann | 366/78 |
| 4,547,076 A | 10/1985 | Maurer | 366/244 |
| 4,637,221 A * | 1/1987 | Levine | 62/342 |
| 4,708,487 A | 11/1987 | Marshall | 366/206 |
| 4,708,489 A * | 11/1987 | Carlson | 366/149 |
| 4,828,866 A | 5/1989 | Wade et al. | 426/599 |
| 4,842,884 A | 6/1989 | Bookwalter et al. | 426/585 |
| 5,114,045 A | 5/1992 | Herpe | 222/105 |
| 5,145,250 A | 9/1992 | Planck et al. | 366/8 |
| 5,150,967 A | 9/1992 | Neilson et al. | 366/206 |
| 5,328,263 A | 7/1994 | Neilson | 366/254 |
| 5,439,289 A * | 8/1995 | Neilson | 366/207 |
| 5,580,007 A | 12/1996 | Caviezel et al. | 241/199.12 |
| 5,599,103 A | 2/1997 | Linscott | 366/343 |
| 5,803,377 A | 9/1998 | Farrell | 241/36 |
| 5,962,060 A | 10/1999 | Farrell | 426/565 |
| 6,326,047 B1 | 12/2001 | Farrell | 426/524 |
| 6,453,803 B1 * | 9/2002 | Sodeyama et al. | 99/348 |
| 6,474,862 B1 | 11/2002 | Farrell | 366/147 |

OTHER PUBLICATIONS

Arbuckle, "Ice Cream," 3rd Edition pp. 54-55, 323-331. 1977.

* cited by examiner

RINSEABLE SPLASH SHIELD AND METHOD OF USE

PRIORITY

This application claims the benefit of U.S. Provisional Application No. 60/426,622, filed Nov. 15, 2002, and entitled RINSEABLE SPLASH SHIELD.

FIELD OF THE INVENTION

The present invention relates generally to the field of machines for mixing liquids, and specifically to devices for preventing splashing of liquids during mixing.

BACKGROUND OF THE INVENTION

Preparation of certain foods and beverages can involve blending, whipping, stirring, etc. the food or beverage. This may be done using a rotary blade or mixer which is lowered into a container holding the food or beverage, or which is held in place as the container is advanced towards the rotary blade/mixer to move the container's contents into contact with the blade/mixer.

In Applicant's U.S. Pat. Nos. 6,474,862, 6,326,047 and 5,803,377 entitled APPARATUS AND METHOD FOR MAKING FROZEN DRINKS, the disclosures of which are incorporated herein by reference, methods for making frozen drinks are described. These patents describe a machine that allows a milkshake or other frozen drink to be quickly made from a block of ingredients pre-frozen into a serving cup. The frozen contents within the serving cup are broken into small frozen particles using a rotating blade, and blended with an added liquid also using the rotating blade.

According to the patents, when a milkshake or other frozen drink is to be made, a serving cup containing the frozen block is positioned in a cup holder which forms a part of the frozen drink machine. A rotating blade is lowered into the cup and bores through the frozen substance in the cup, grinding it into small frozen particles. As the blade moves towards the bottom interior of the cup, milk, water, or another liquid is added to the cup and is blended into the frozen substance by the rotating blade. Alternatively, the rotating blade may be held at a fixed elevation, and the cup may be advanced towards the blade to move the cup's contents into contact with the blade. In either case, the cup and/or blade may be reciprocated to allow the full contents of the cup to be mixed.

During mixing, material can splash from the cup onto the drink machine and surrounding area. U.S. Pat. Nos 5,328,263 and 5,439,289 (Neilson) each describe a separate, dedicated lid placement mechanism that positions a lid onto a cup so as to minimize such splashing when the contents of the cup are being mixed. U.S. Pat. No. 5,145,250 (Planck) describes a mixing device wherein the lid and mixing device move axially together until the lid makes contact with the receptacle, at which time springs keep the lid in contact with the receptacle as the mixing head travels further into the receptacle. In each case, there is potential for carryover of mixed ingredients from one batch to the next. In Planck, a disposable cover over the pressure plate of the lid is described. In Neilson U.S. Pat. No. 5,439,289 a provision for a releasable lid connector means is claimed to enable cleaning of the lid remotely from the mixing device. It is further desirable, however, to provide a drink mixer having a splash shield that may not only be located on the cup to avoid splashing during mixing, but that may also be automatically rinsed in place following mixing.

SUMMARY OF THE INVENTION

The present application describes a method for rinsing a splash shield. According to the disclosed method, a vessel containing contents to be mixed is positioned in a mixing machine, and a splash shield is positioned over the opening of the vessel. After the material within the vessel is mixed by a mixing element, the splash shield is separated from the vessel and rinsed by a nozzle on the mixing machine.

In another embodiment, a vessel containing contents to be mixed is positioned in a holder on a mixing machine, and a splash shield (which may or may not be rinseable) is positioned over the opening of the vessel. The contents of the vessel are mixed using a mixing element. During and/or after mixing, opposed relative movement of the mixing element and vessel may occur, creating an upward lifting force on the vessel. The weight of the shield is sufficient to overcome this upward lifting force on the vessel and thereby causes the vessel to remain seated in the holder.

DETAILED DESCRIPTION OF THE DRAWINGS

Figure 1:
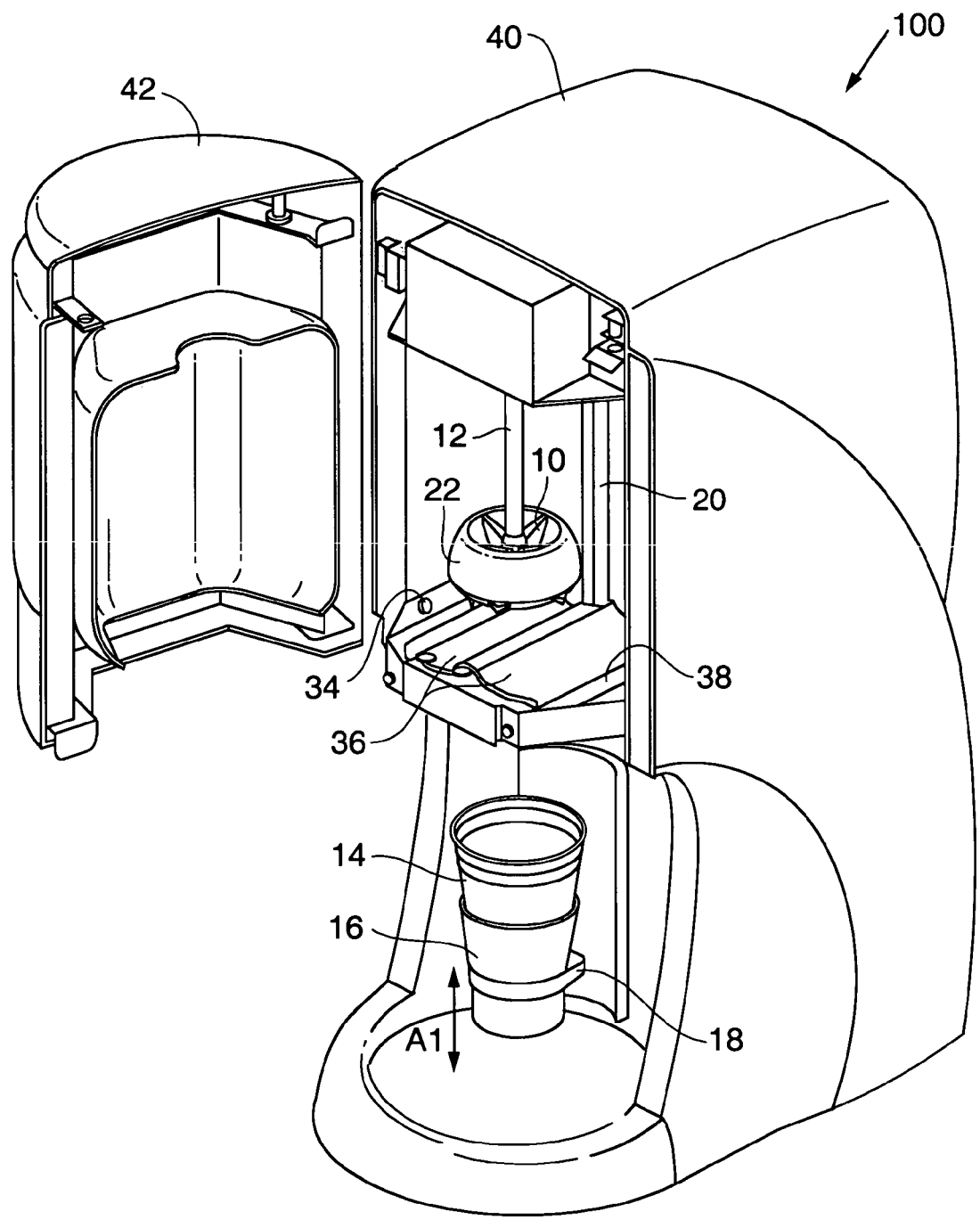
FIG. 1 is a top perspective view of a drink machine having a rinseable splash shield.

Referring to FIG. 1, the splash shield disclosed in this application is preferably provided as a component of a mixing/blending machine 100 that uses a rotating blade to mix/blend the contents within a cup or other vessel. Machine 100 may be a machine such as the f'REAL! Self-Serve Milkshake Blender available from f'REAL! Foods LLC, 37 Avenida de Orinda, Orinda, Calif., which is particularly useful for mixing/blending drinks such as frozen milkshakes, coffee drinks, or smoothies. However, it should be appreciated that the rinseable shield may be suitable for use on other types of machines for mixing and/or blending various materials, including powders, slurries and other types of liquids.

Machine 100 includes a mixing blade 10 carried on an elongate shaft 12. Mixing blade 10 is rotatable by means of a motor (not shown) and is designed to bore through the frozen substance in a cup 14. As described in greater detail in Applicants U.S. Pat. Nos. 6,474,862, 6,326,047 and 5,803,377, cup 14 is preferably a serving cup within which milkshake or other frozen drink ingredients have been pre-frozen into a block. A cup holder 16 supports the cup and is preferably moveable as indicated by arrow A1 in FIG. 1, to cause the mixing blade to blend the frozen drink in the cup. Although movement of the holder 16 can be achieved in various ways, in the FIG. 1 embodiment the cup holder 16 is mounted to a carriage 18 that is moveable along a vertical rail 20 by means of a motor and lead screw assembly (not shown) disposed within the machine 100. Mixing blade 10 is rotatable by means of a motor (not shown) and is designed to bore through the frozen substance in the cup. As described in Applicant's prior patents, water, milk or another liquid is added to the cup for blending with the frozen substance, which is broken up into small frozen particles by the boring blade 10. The added liquid may be directed into the cup from above, such as through a fluid outlet oriented adjacent to the shaft.

As discussed, during mixing, the cup 14 is preferably reciprocated by cup holder 16 as indicated by arrow A1 in FIG. 1, to cause the rotating blade 10 to pass through the contents of the cup one or more times. Obviously, the blade 10 may include a second motor for moving the shaft 12 longitudinally, in which case the need for the motor associated with cup holder 16 would be eliminated.

Figure 2:
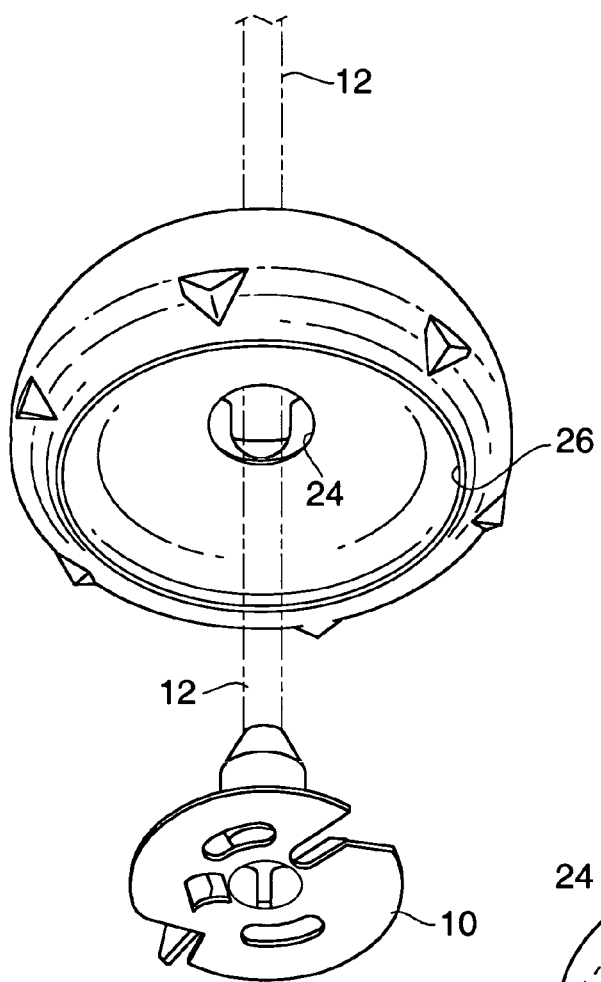
FIG. 2 is a bottom perspective view showing a splash shield, shaft and mixing blade of FIG. 1, with the splash shield displaced from the mixing blade. For clarity, the portion of the shaft passing through the splash shield is not shown.
Figure 3:
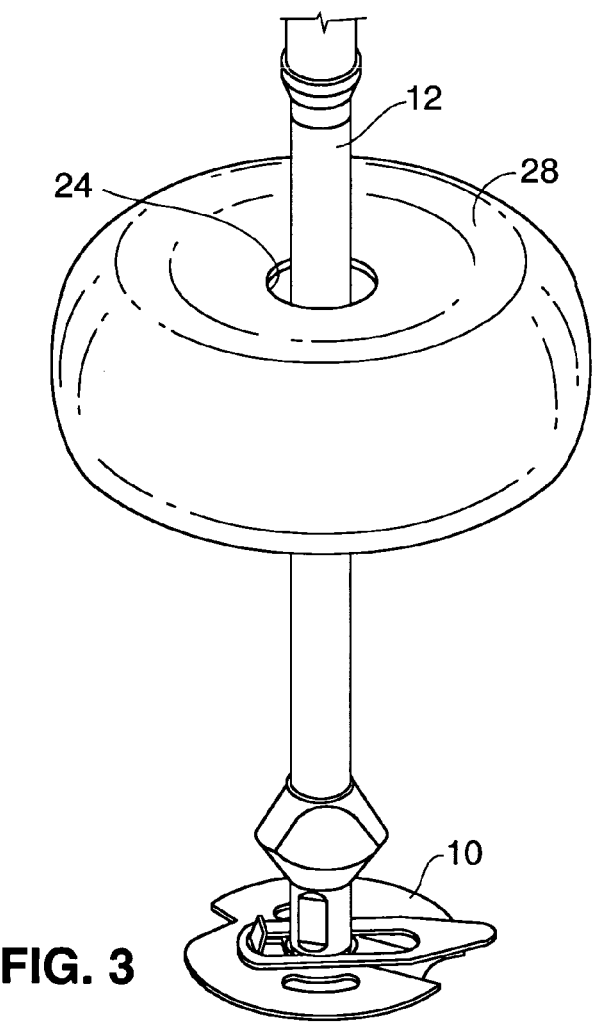
FIG. 3 is top perspective view of the components shown in FIG. 2.

Referring to FIGS. 2 and 3, splash shield 22 is preferably comprised of a lid proportioned to seat along the upper edge of cup 14. The shield includes an upper opening 24 and a larger lower opening 26. Shaft 12 extends through the openings 24, 26 such that the mixing blade 10 is positioned beneath the shield 22.

Shield 22 may have a dome-shaped configuration as shown, although other configurations would be equally suitable. As shown in FIG. 3, a wall 28 tapers inwardly from the uppermost surface of the shield 22 down to the upper opening 24. Spaced apart ribs 30 are positioned along the wall 28 and function to contact a tapered portion 32 of the machine's mixing shaft (as shown in FIG. 1) when the shield 22 is lowered relative to the shaft. When the shield is raised relative to the shaft, the shield 22 and tapered portion 32 separate as in FIG. 2.

Referring again to FIG. 1, one or more nozzles 34 (only one is shown) are provided for directing rinsing fluid into the interior of shield 22. Nozzles 34 are coupled to one or more sources of rinse fluid, such as water (preferably hot or warm water) and/or sanitizing solution such as a quaternary ammonium sanitizer solution.

Machine 100 includes a pair of automatic hinged doors 36 along the path of travel of holder 16. A fluid trough 38 for receiving rinse water shed from the shield surrounds the hinged doors. A drain line (not shown) is fluidly coupled to the trough, and the trough includes gradients arranged to direct water towards the drain line. The trough 38, rinse nozzle 34, shaft 12, shield 22 and mixing element are preferably positioned within an enclosure 40 having an access door 42 (as shown in FIG. 1).

A controller (not shown) within the machine controls operation of the motors for the cup holder, blade and hinged doors, as well as the liquid dispense and rinsing functions.

Operation

Figure 4:
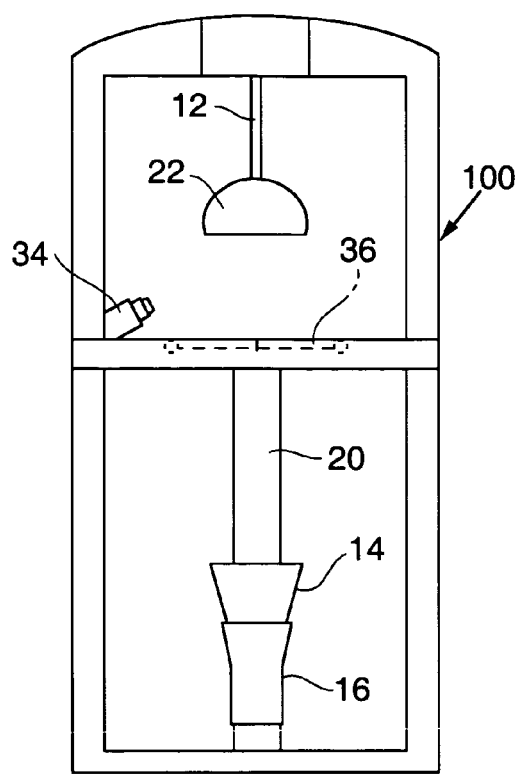
FIGS. 4 through 7 are a sequence of front elevation views of the drink machine of FIG. 1 illustrating use of the rinseable splash shield.
Figure 5:
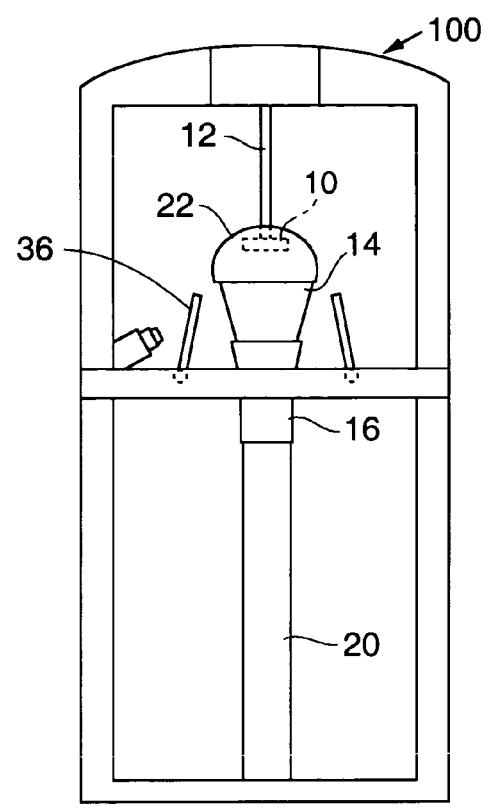
Figure 6:
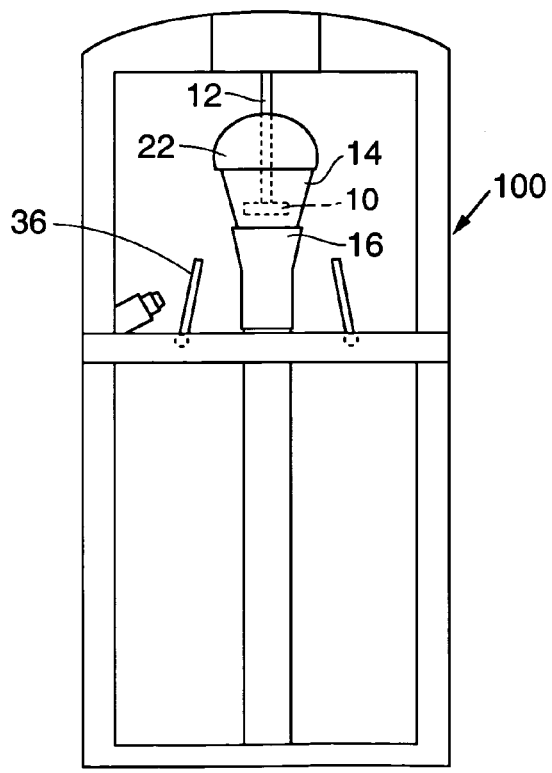

FIGS. 4–7 are a sequence of drawings that illustrate operation of the rinseable splash shield. First, a cup 14 containing frozen ingredients is positioned in cup holder 16 as shown in FIG. 4 and the user depresses a "start" button (not shown) on the exterior of the machine 100. Next (FIG. 5), hinged doors 36 are opened and holder 16 is moved upwardly along rail 20, thereby moving the upper edge of cup 14 into contact with the shield 22. Continued upward movement of the holder 16 causes the shield 22 to be raised upwardly on the shaft, and the tapered section 32 of the shaft 12 to separate from ribs 30 of the shield 22, as the cup 14 moves up around the blade 10, as shown in FIG. 6. Rotation of the blade is activated (or may be activated at an earlier stage), and water, milk or other fluid may be directed into the cup as described in Applicant's earlier patents, causing the frozen beverage to be made. During mixing/blending the holder 16 (or the blade) may be reciprocated to allow the blade to pass through the full contents of the cup more than one time.

It should be noted that the shield 22 may be weighted to ensure a good seal with the cup. This eliminates the need for springs, as disclosed in Plank U.S. Pat. No. 5,145,250, or some other mechanism such as those described in Neilson U.S. Pat. Nos. 5,328,263 and 5,439,289, to hold the shield in position during mixing. Weighting the shield is of further advantage if it is heavy enough to create sufficient downward force on the cup to overcome any upward force created by the mixing blade being moved upwardly in the cup. The mixing blade can create such upward force as the mixing blade moves upwardly in the cup, imparting an upward force on the cup as a result of suction force or the viscous nature of the product being mixed in the cup. This can occur when the cup is lowered by the holder during mixing (i.e. when the cup is reciprocated to cause the mixing blade to pass through the cup's contents several times) and/or when the cup is lowered away from the blade after blending/mixing. Making the weight of the shield sufficient to overcome this upward lifting force on the cup causes the cup to remain seated in the cup holder without any other mechanical means of retaining it in the cup holder, such as clamping or gripping mechanisms or the springs or lid placement and retention mechanisms previously described. In one embodiment, the shield may be a cast stainless steel lid having a weight of approximately 5 lbs. It should be noted that a weighted splash shield may be provided even if the rinsing feature is not present.

Once the beverage is made, the cup holder 16 is lowered and thereby moves the cup 14 downwardly away from the blade. The descending cup carries the shield 22 downwardly until the ribs 30 of the shield engage tapered portion 32 of the shaft 12. At this point, the cup 14 separates from the shield 22 and is moved by the holder 16 to the position shown in FIG. 4. The cup may then be removed from the drink machine 100.

Figure 7:
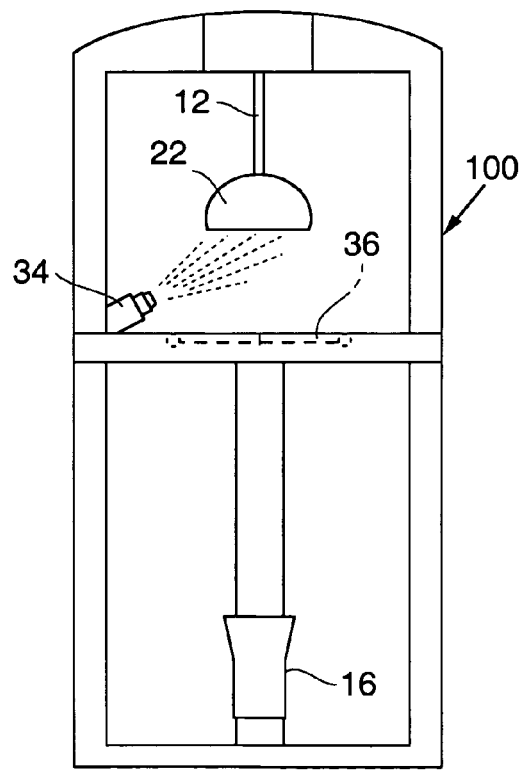

Next, the hinged doors 36 are closed and rinse fluid is directed onto the shield 22 using nozzle 34 as shown in FIG. 7. If desired, the shaft 12 may be rotated during and after rinsing. Given the weight of the splash shield and the contact between ribs 30 and tapered section 32 on the shaft, rotating the shaft 12 rotates the splash shield as well, thus allowing the rinse water to be spun off of the shield. Rotation may be of particular advantage if a single nozzle 34 is used for rinsing, since it allows the full interior of the shield 22 to be exposed to the fluid spray from the nozzle. The shield, blade and closed doors 36 shed the rinse fluid into trough 38, which then directs the water out of the machine via the drain line.

I claim:

1. A method for rinsing a splash shield on a mixing machine, the method comprising the steps of:
    providing a vessel containing contents to be mixed, the vessel including an opening;
    further providing a mixing machine having a holder for receiving the vessel at an access location in the mixing machine, a rotatable mixing element extendable into the vessel for mixing the contents of the vessel, a splash shield positionable over the opening of the vessel, and a nozzle oriented towards the splash shield;
    after mixing the contents of the vessel using the mixing element and with the splash shield covering the opening, separating the splash shield and the vessel; and
    directing rinsing fluid onto the splash shield using the nozzle while shielding the access location from the rinsing fluid.

2. The method of claim 1, wherein the directing step is performed automatically after the separating step.

3. The method of claim 1, wherein the holder is moveable from the access location in a first direction towards the splash shield and a second direction away from the splash shield to the access location and wherein the separating step includes the step of moving the holder in the second direction.

4. The method of claim 3, wherein:
the mixing element is on a shaft;
the splash shield is engageable with a member on the shaft, the splash shield disengageable from the member in response to upward force against the shield, and mixing is carried out with the splash shield disengaged from the member;
the step of moving the holder in the second direction separates the vessel and splash shield and causes the splash shield to engage with the member on the shaft; and
the method further includes the step of rotating the shaft to rotate the splash shield during the directing step.

5. The method of claim 1, further including the step of rotating the splash shield during the directing step.

6. The method of claim 1, wherein the directing step directs warm water.

7. The method of claim 1, further including the step of directing rinsing fluid onto the mixing element.

8. The method of claim 1, wherein the method includes the steps of:
with the mixing element in the contents of the vessel, causing relative movement of the mixing element and vessel in opposite directions, and
causing the splash shield to retain the vessel within the holder during relative movement of the mixing element and vessel in opposite directions.

9. The method of claim 8, wherein in the causing step the mass of the splash shield retains the vessel within the holder.

10. The method of claim 1, wherein the directing step directs a rinse solution comprising sanitizing solution.

11. The method of claim 10, wherein the sanitizing solution includes a quaternary ammonium sanitizer solution.

12. The method of claim 1 wherein:
the mixing machine further includes a rinse chamber having an entrance and a door,
during the rinsing step the splash shield is positioned within the rinse chamber; and
wherein the shielding step includes moving the door to a closed position to enclose the splash shield within the rinse chamber.

13. The method of claim 12 wherein the door defines a flow path and wherein the method includes causing rinse water falling from the splash shield to flow along the flow path to a drain.

14. The method of claim 12 wherein the separating step includes the step of moving the holder in a first direction to move the opening of the vessel from a first position within the rinse chamber to a second position at the access location.

15. On a mixing machine for mixing a liquid contained in a vessel having an opening, the mixing machine of a type including a rotatable mixing element extendable into the vessel for mixing the contents of the vessel, the improvement comprising:
a rinse chamber in the mixing machine, the rinse chamber having an entrance and a door moveable to a closed position covering the entrance;
a splash shield carried by the mixing machine, the splash shield positionable covering the opening of the vessel, and
at least one nozzle coupled to a source of rinse fluid and oriented to direct rinse fluid onto the splash shield within the rinse chamber.

16. The improvement of claim 15, wherein the mixing machine is further of the type wherein the mixing element is carried by a shaft, and wherein in the improvement the splash shield is carried by the shaft.

17. The improvement of claim 16, wherein the improvement further includes means for moving the holder in a first direction towards the splash shield to move the vessel into contact with the splash shield and in a second direction away from the splash shield to separate the vessel from the splash shield.

18. The improvement of claim 17, wherein the splash shield is engageable with a member on the shaft and is disengageable from the member in response to upward force by the vessel against the splash shield.

19. The improvement of claim 18, wherein the shaft is rotatable to rotate the splash shield as rinse fluid is directed onto the splash shield by the nozzle.

20. The improvement of claim 15, wherein the at least one nozzle is oriented to direct rinse fluid onto the mixing element.

21. The improvement of claim 17, wherein the splash shield is of sufficient mass to remain in position covering the opening of the vessel during movement of the holder in the second direction until it engages with the member.

22. The improvement of claim 15, wherein the splash shield is of sufficient mass to retain the vessel within the holder during relative movement of the mixing element and vessel in opposite directions.

23. The improvement of claim 15, wherein:
the improvement further includes a holder proportioned to receive the vessel and moveable in a first direction to carry at least the opening of the vessel through the entrance into the rinse chamber and into contact with the splash shield, and moveable in a second direction to separate the opening of the vessel from the splash shield.

24. On a mixing machine of a type having a rotatable mixing element extendable into a vessel for mixing the contents of the vessel, the improvement comprising:
a splash shield carried by the mixing machine, the splash shield positionable to shield the opening of the vessel,
a source of rinse fluid;
at least one nozzle coupled to the source of rinse fluid and oriented to direct rinse fluid onto the splash shield; and
an access location in the mixing machine, the vessel positionable at the access location in preparation for mixing of the vessel contents and retrievable from the access location following mixing; and
a barrier moveably positioned to shield the access location from rinse fluid.

25. The improvement of claim 24, wherein the source of rinse fluid comprises sanitizing solution.

26. The improvement of claim 25, wherein the sanitizing solution includes a quaternary ammonium sanitizer solution.

* * * * *